Sept. 5, 1967  G. BRIDLE ETAL  3,339,969
LUGGAGE COMPARTMENTS FOR MOTOR VEHICLES
Filed June 22, 1965  3 Sheets-Sheet 3
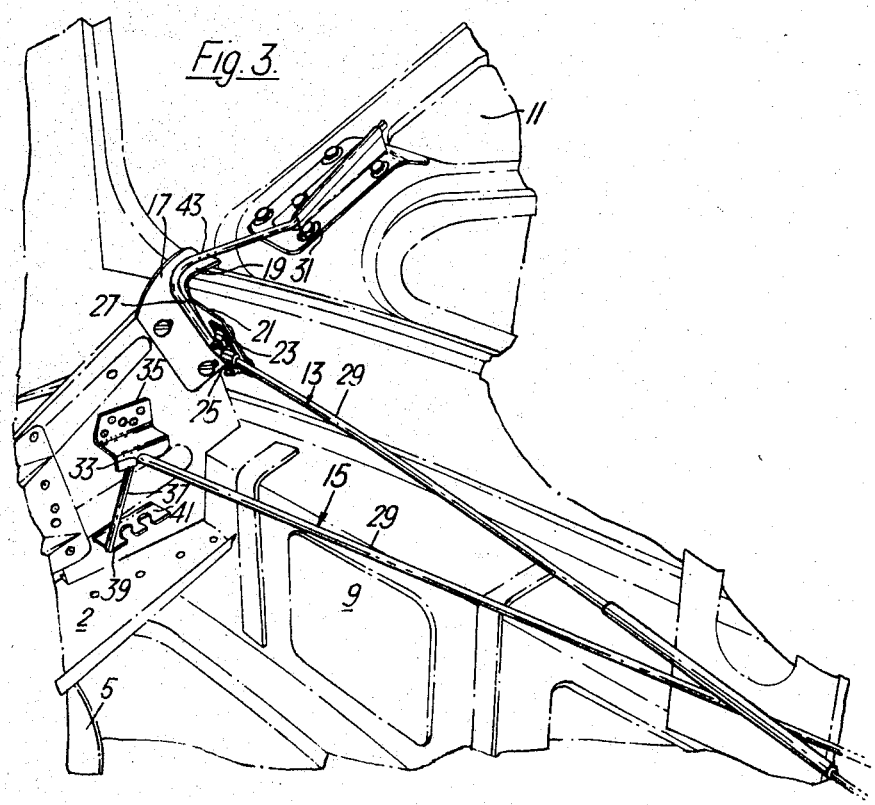
GLYNNE BRIDLE
PETER T. HILLS
Inventors
By John R. Faulkner
John J. Boethel
Attorneys United States Patent Office 3,339,969
Patented Sept. 5, 1967

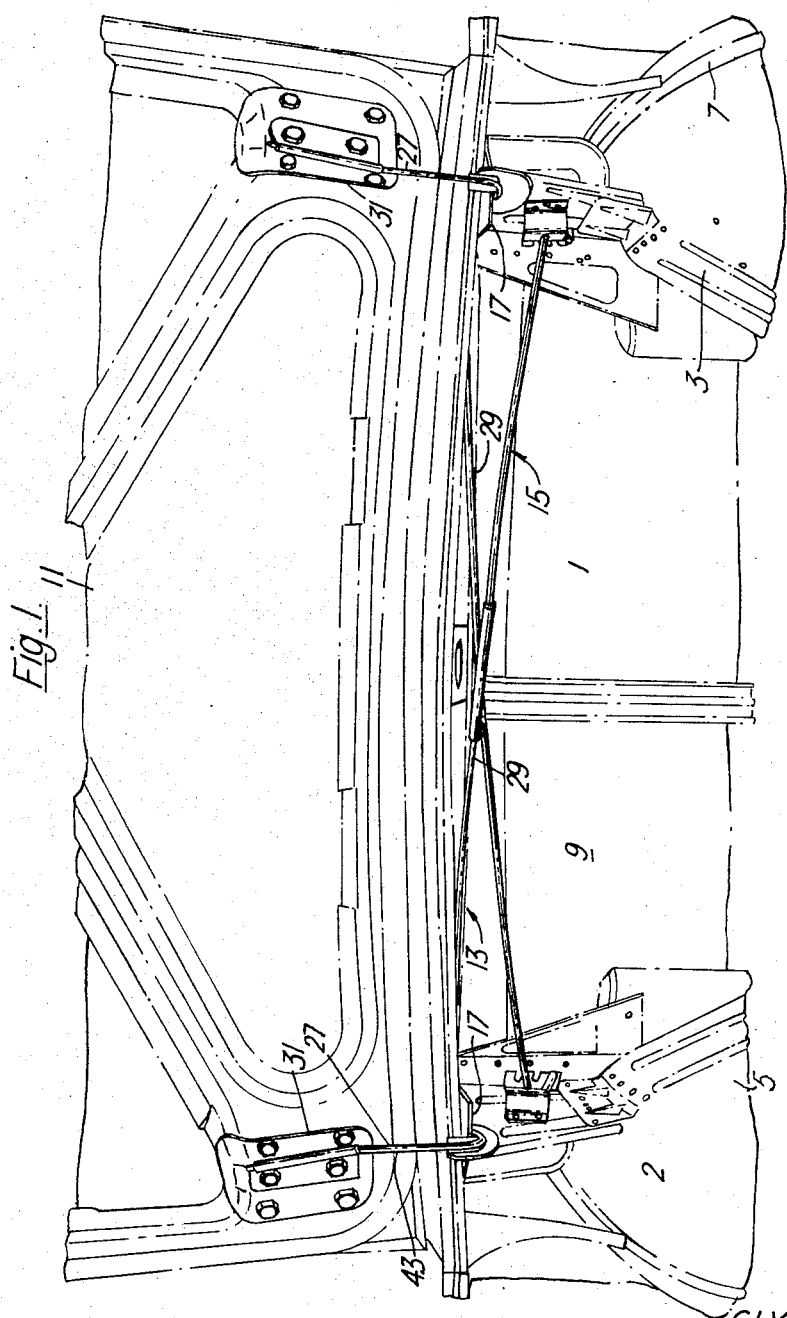

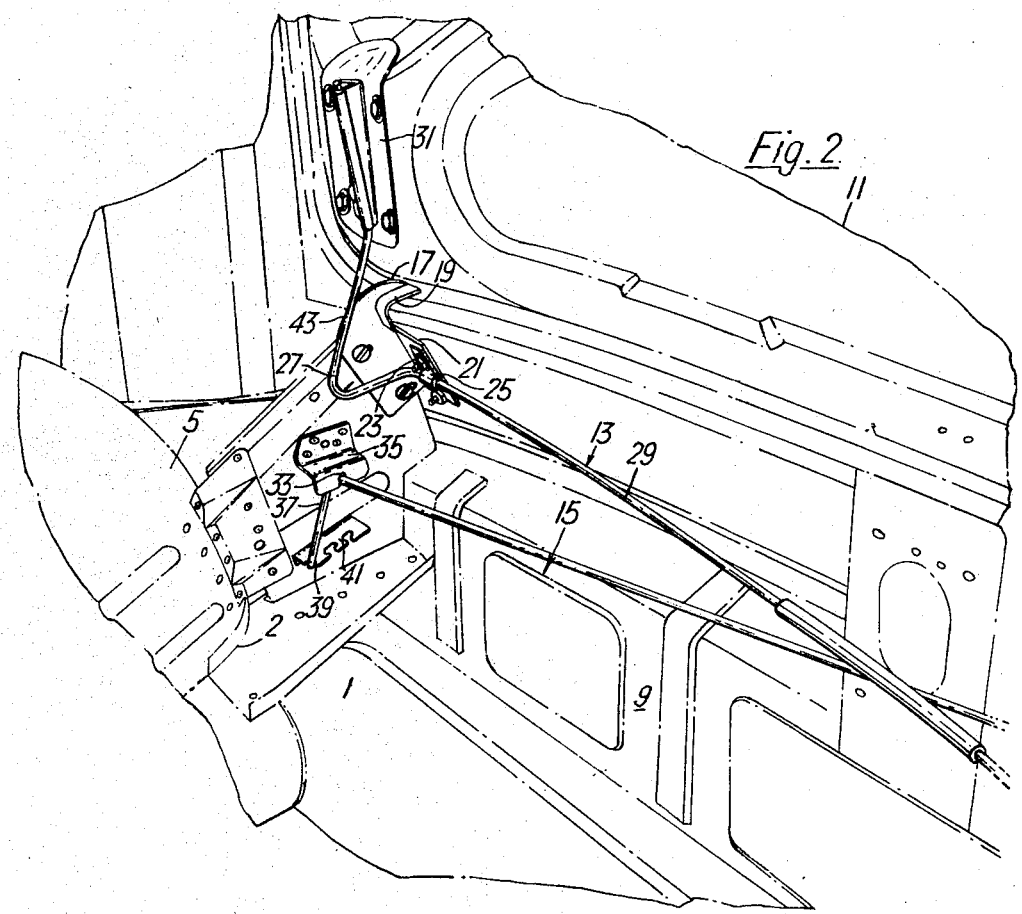

3,339,969
LUGGAGE COMPARTMENTS FOR MOTOR
VEHICLES
Glynne Bridle, Hornchurch, and Peter T. Hills, Hainault, Ilford, England, assignors to Ford Motor Company, Dearborn, Mich., a corporation of Delaware
Filed June 22, 1965, Ser. No. 465,874
Claims priority, application Great Britain, July 8, 1964, 28,251/64
2 Claims. (Cl. 296—76)

This invention relates to compartments having closures therefor and in particular to luggage compartments and closures therefor in motor vehicles.

At present the lids of luggage compartments in motor vehicles are pivotally mounted in the vehicle body and are biased towards an open position by a pair of torsion bars. The pivotal mounting is achieved by a pair of hinge arms fixed to the lid and pivotally mounted in the body.

A compartment according to this invention has a pivotally mounted closure member biased into one position and a torsion bar both acts as a hinge pin for, and as the means for biasing, the member towards the latter position.

In a motor vehicle according to this invention a pivotally mounted lid of a luggage compartment is biased towards its open position by a pair of torsion bars which also act as the hinge pins for the lid.

The dual function of the torsion bar or bars enables the combined cost of the pivotal mounting of the lid or closure member and the torsion bar or bars to be reduced. In a motor vehicle luggage compartment each torsion bar both acts as the hinge and hinge arms.

Preferably, the torsion bars cross over so that the first end of the first torsion bar is anchored in the vehicle body within the compartment at one side of the vehicle and the second end is anchored in the lid at the other side of the body, and that the first end of the second torsion bar is anchored in the vehicle body within the compartment at the same side of the vehicle as the second end of the first torsion bar.

Advantageously, the part of each bar anchored in the lid is a first arm at approximately right angles to the axis of the second arm which is subjected to torsional stress; and, during opening of the lid the first arm engages an abutment on the body and is stressed by the torsion in the second arm as the lid approaches its fully open position so as gradually to arrest the lid.

FIG. 1 is a perspective view from the rear part of the lid and luggage compartment of a motor vehicle;

FIG. 2 is a perspective view of the same parts as in FIG. 1 from the side, the lid being closed; and FIG. 3 is a fragmentary view similar to FIG. 2 with with the lid fully open.

The drawings show the luggage compartment 1 of a motor vehicle. The compartment has side walls 2 and 3 partially constituted by wheel arches 5 and 7, a front wall 9 to the rear of a passenger seat (not shown) and a lid 11.

The lid 11 is pivotally mounted about an axis transverse to the longitudinal center line of the vehicle and is biased towards the open position by first and second torsion bars 13 and 15, respectively, which also act as pivot pins and hinge arms.

A bracket 17 is bolted to each side wall 2 or 3 and has a V-shaped abutment 19, whose function is described later, and a mounting portion 21. A member 23 having a part cylindrical recess 25 is bolted to each mounting portion 21.

Each torsion bar includes a first arm 27 and a second arm 29, the arms being approximately perpendicular to each other. The first arm 27 is V-shaped; one limb of the V is anchored in the lid by a mounting 31 bolted to the lid; and the second limb joins the second arm immediately adjacent a member 23. Each second arm extends through and is journalled in a recess 25, the recess being of course aligned. Each second arm 29 extends across the vehicle so that the torsion bars overlap, and fits in a slot 33 in a bracket 35 bolted to a side wall 2 or 3 of the vehicle. The end 37 of each second arm is perpendicular to the main part and fits in a slot 39 in another bracket 41 bolted to a side wall 2 or 3 of the vehicle to ensure that the latter end of the second arm cannot rotate in the slot 33.

When the lid 11 is closed, the arms 29 are twisted. When the latch (not shown) for the lid is released, the torsional stress in the arms 29 swings the lid upwardly. However, before the lid reaches the fully open position, the limbs of the V-shaped first arms 27 are engaged by the apices of the V-shaped abutment 19 and continued movement of the lid opens the V until the V-shaped first arms 27 fit around the V-shaped abutments 19. Thus, the opening movement of the lid is gradually arrested by stressing the limbs to prevent the lid from being abruptly stopped by abutments, the stressing absorbing excess energy.

In order to obtain a good seal at the front edge of the lid, a seal around the compartment opening is so located that when the lid is still slightly open the seal is compressed with the result that when the lid is closed the seal is tightly compressed. When the lid is closed the torsion bars tend to pivot the lid about the latch (not shown) at the rear of the component, and this tends to lift the front edge of the lid off the seal. However, since the seal is tightly compressed by closing the lid, such pivotal movement about the latch does not move the front edge of the lid clear of the seal.

We claim:
1. A motor vehicle body in which a pivotally mounted lid of a luggage compartment is biased towards its open position by a pair of torsion bars which also act as the hinge pins and arms for the lid;
   said torsion bars being crossed over so that the first end of the first torsion bar is anchored in the vehicle body within the compartment at one side of the vehicle body and the second end is anchored in the lid at the other side of the vehicle body, and so that the first end of the second torsion bar is anchored in the vehicle body within the compartment at the same side of the vehicle body as the latter end of the first torsion bar;
   the part of each bar anchored in the lid being a first arm comprising two sections in V-shaped configuration at approximately right angles to the axis of a second arm which is subjected to torsional stress, and in which, during opening movement of the lid, said sections engage an abutment on the body spreading the V-sections to stress the same as the lid approaches its fully opened position so as to gradually arrest the opening movement of the lid.

2. A motor vehicle body according to claim 1 in which the first arm is V-shaped; one limb of the V is anchored to the lid; the second limb of the V joins the second arm; and during opening movement of the lid, the first limb engages and is deflected by a V-shaped abutment on the vehicle body until the V-shaped first arm fits around the abutment.

References Cited

UNITED STATES PATENTS

| 2,112,451 | 3/1938 | Best et al. | 229—44 |
| 2,916,763 | 12/1959 | Wagner | 16—180 |
| 2,951,611 | 9/1960 | Tillson et al. | 220—34 |

BENJAMIN HERSH, *Primary Examiner.*

MILTON BUCHLER, *Examiner.*

J. H. BRANNEN, *Assistant Examiner.*